United States Patent [19]
Hardway, Jr.

[11] 3,729,991
[45] May 1, 1973

[54] CAPACITIVE DISPLACEMENT TRANSDUCER

[75] Inventor: Edward V. Hardway, Jr., Houston, Tex.

[73] Assignee: Spearhead, Inc., Houston, Tex.

[22] Filed: May 17, 1971

[21] Appl. No.: 144,016

[52] U.S. Cl. .................. 73/136 A, 317/246, 323/93, 340/200
[51] Int. Cl. .............................................. G01l 3/10
[58] Field of Search ...................... 73/136 A, 136 B, 73/136 C; 317/246, 255; 323/93; 340/200

[56] References Cited

UNITED STATES PATENTS

| | | | |
|---|---|---|---|
| 3,487,402 | 12/1969 | Hillhouse | 317/255 X |
| 2,527,215 | 10/1950 | Hahn | 323/93 X |
| 3,312,892 | 4/1967 | Parnes | 323/93 |
| 3,329,012 | 7/1967 | Demuth | 73/136 A |

FOREIGN PATENTS OR APPLICATIONS 790,692  2/1958  Great Britain ..................... 73/136 A Primary Examiner—Charles A. Ruehl
Attorney—Hyer, Eickenroht, Thompson & Turner

[57] ABSTRACT

A capacitive displacement transducer for measuring relative displacement between two points or objects is disclosed as including a driven element connected to a source of input electrical signals, a receptor element connected to an electrical output signal circuit means, and two shield elements mounted between the driven and receptor elements for relative movement with respect to each other. One of the shield elements mechanically responds to one of the objects and the other shield element mechanically responds to the other object and any resulting relative movement between the shield elements changes the capacitive coupling between the driven and receptor elements to provide an electrical output signal proportional to this movement and the displacement between said objects.

17 Claims, 6 Drawing Figures

EDWARD V. HARDWAY, JR.
INVENTOR.

BY Hyer, Eickenroht,
Thompson & Turner

ATTORNEYS

Patented May 1, 1973 3,729,991

EDWARD V. HARDWAY, JR
INVENTOR.

BY Hyer, Eickenroht, Thompson & Turner

ATTORNEYS

CAPACITIVE DISPLACEMENT TRANSDUCER

This invention relates to the measurement of relative displacement between two objects or points on an object and in one of its aspects to a capacitive transducer for use in providing such a measurement. Another aspect of this invention relates to such a device which is particularly adaptable to measure torque transmitted from one object to another.

There are many applications for transducer devices which respond to the relative displacement between two points to provide electrical signals proportional to this displacement. One important application is the measurement of torque such as on a rotating shaft by determining the angular displacement between two axially separated points on the shaft.

There is a well-recognized need for torque sensors in industrial power equipment, in instrumentation, such as in engine and motor testing, and in monitoring power (torque X speed) transmitted by a shaft. Many torque sensor applications call for continuous torque measurements over extended periods of time, some in spite of very high rotational speeds. Stability of zero and calibration is important and the need for periodic maintenance should be minimal in these applications.

A large number of different types of torque sensors are available today. The most widely known kind of torque sensor has been referred to as "the angle of twist" type. The basic principle used with this type of torque sensor is that when the shear modulus of the shaft material is known, the relationship between the angle of twist produced in a predetermined length of shaft and torque can easily be determined. Different torque sensors utilize different methods of sensing this angle, and different methods of transmitting it from the shaft to the indicating instruments. One well-known device utilizes a linear differential transformer and slip rings. Another uses wires stretched between cogs, and sensors determining the frequency of resonance of different wires. Other devices use magnetic or photo-electric pickups sensing the direct phase shift between two sets of cogs.

A different variation of the angle-of-twist type of torque sensor uses strain gauges bonded to the shaft surface to determine the twist in the shaft. Slip rings or rotating transformers are used for information transfer from shaft to readout.

These types of devices are not wholly satisfactory because of the difficulty of keeping the pickup surfaces firmly secured to the shaft at a precise spacing, or the difficulty of maintaining a proper bond between strain gauges and the shaft. Also, a major problem has been the link between the shaft and its surroundings. Slip rings will wear and provide poor electrical contact when dirty; rotating transformers are relatively expensive and not suitable for large shafts; and the phase angle pickups require precise alignment and are sensitive to mechanical shifts between the foundation and the axis of the shaft. Also, noise in slip rings and stray magnetic pickup in low level circuits causes inaccuracies and loss of reliability, and decrease the sensitivity of the instrument.

Some of these problems are avoided by such devices as the magneto-elastic TORDUCTOR (a registered trademark of ASEA, Inc.) torque transducer which relies on measurement of changes in an induced magnetic field on a shaft in response to stress or strain to provide an indication of torque on the shaft. However, such a device requires sophisticated and expensive magnetic pickup devices and electronics to measure and respond to very small phase relationships independent of shaft speed. Also, mechanically the device must be very precise thus increasing its cost of manufacture.

Although numerous types of capacitive displacement transducers have been made available in the prior art, use of these transducers as torque sensors, as contemplated by the present invention, has not been practical. This is primarily because excessive fringing effects near the ends of the capacitive elements, and the effect of stray capacitance, greatly reduces the resolution and usefulness of the device. A copending patent application of James A. Parnell, Ser. No. 89,514, filed Nov. 13, 1970, now U.S. Pat. No. 3,668,672, discloses a device (hereinafter termed the "Parnell transducer") which provides electrical output signals proportional to displacement, and greatly reduces fringing effects between the capacitive elements, has infinite resolution, excellent repeatability, and high stability. This is accomplished in the disclosed preferred embodiment of the Parnell transducer by providing a rotatable grounded shield between a fixed driven plate connected to a source of input electrical signals, and a receptor or conductive plate connected to an electrical read-out circuit. An active area on the receptor plate is clamped by a suitable circuit means to a very low signal level with respect to the input electrical signals to minimize capacitive coupling between the shield plate and the active area of the receptor plate. The Parnell transducer solves many of the technical problems of capacitive transducers inherent in prior art devices, yet is simple and relatively inexpensive to construct.

The present invention relates to a novel modification of the Parnell transducer which is particularly adaptable for use in measuring relative displacement between two objects or two points on a rotating shaft. An important object of this invention is to provide such a transducer which has the advantages of the Parnell transducer and further has characteristics such that it can be readily adapted for measuring the angle of twist and thus torque along a rotating shaft.

Another object of this invention is to provide such a capacitive displacement transducer which can be used in measuring relative displacement between two moving elements when both are in motion.

Another object of this invention is to provide such a transducer which does not use slip rings for electrical contact or rotating transformers, and which has relatively better reliability and longer life than prior art devices provided for the same general purpose.

Another object of this invention is to provide such a transducer which is relatively inexpensive and simple to construct.

Another object of this invention is to provide such a transducer in which the effects of stray capacity and fringing between the capacitive elements is minimized and in which relatively low input and output impedances are provided so that it can be used with relatively simple and inexpensive electronic read-out and signal utilization circuits.

These and other objects are accomplished, according to the illustrated preferred embodiments of this invention, by mounting two movable shield elements in a suitable housing between a driven element connected to a source of input electrical signals and a receptor element connected to an amplifier for providing electrical output signals responsive to the capacitance between the respective elements. Each shield element includes at least one opening aligned adjacent a similar opening in the other shield element and is maintained at ground or at some low signal value with respect to the input signals. In one embodiment, the shield elements are connected to separate movable objects, such as separate rotatable shafts, and in another embodiment used as a torque sensor one shield element is mechanically coupled to a rotatable shaft at one point along its length, and the other shield element is mechanically coupled to the shaft at another point spaced from the first point. Movement of the separate moveable objects, or twisting of the shaft in the torque sensor, such as caused by torque transmitted along the shaft, will cause the shield elements to move with respect to each other resulting in a change in the capacitive coupling between the driven and receptor elements. The amplifier connected to the receptor elements responds to this change in capacitive coupling to provide a signal indicative of such change. The amplifier includes a negative feedback circuit which clamps the signal level on the active element to some low signal level with respect to the input signals to the driven element. This arrangement results in minimizing the effect of stray capacitances and fringing between the capacitive element so that infinite resolution, repeatability, and reliability can be provided.

In the drawings, wherein like reference numerals are used throughout to designate like parts, FIG. 1 is a front view of a housing in which the preferred form of capacitive displacement transducer of this invention, when used in torque measuring applications, is mounted;

Figures 1, 2, 6:
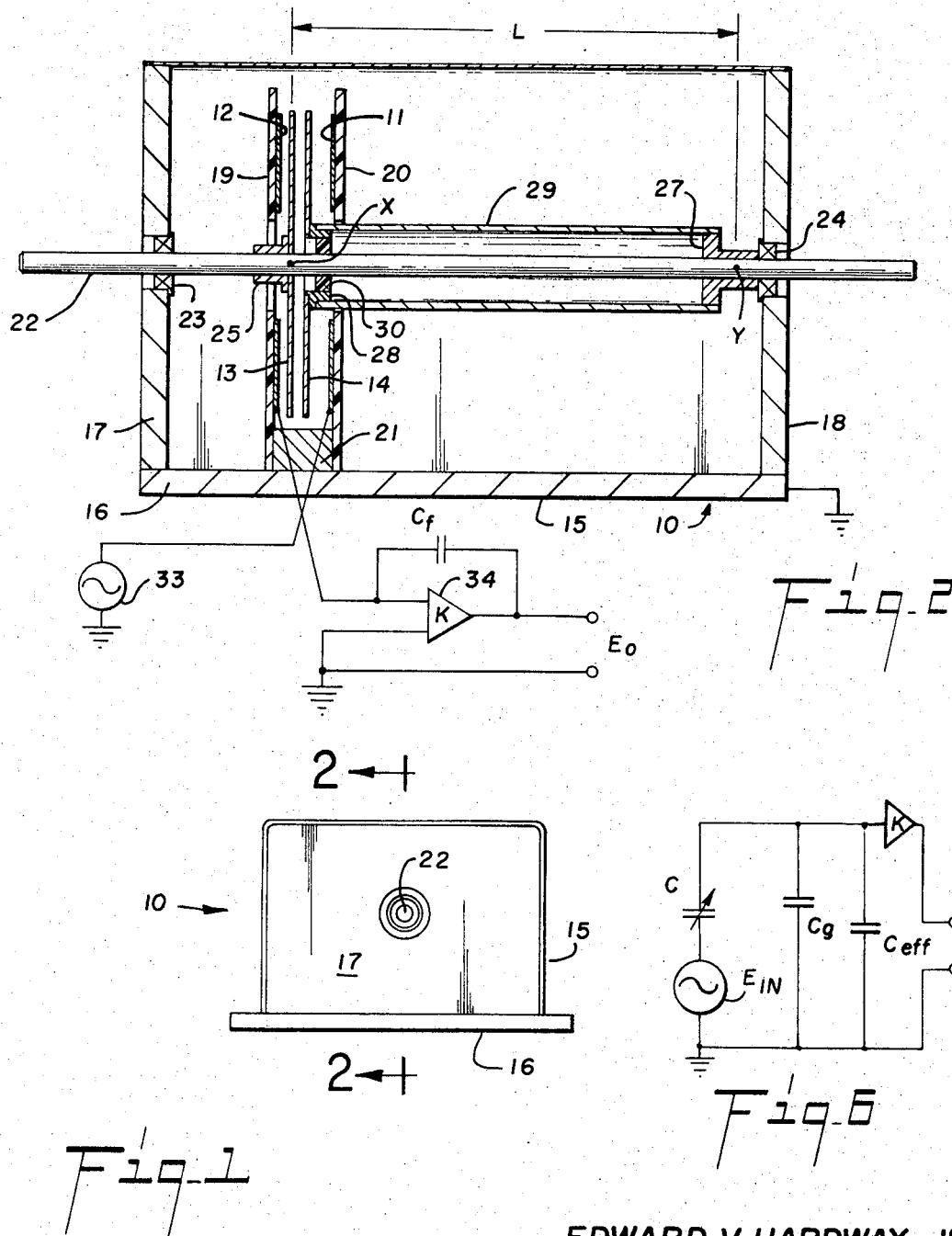
FIG. 2 is a sectional view taken at 2—2 of FIG. 1.
FIG. 6 is a schematic diagram of the equivalent circuit of the devices of FIGS. 2, 3 and 5 with the electrical input and output circuits connected to them.
Figure 5:
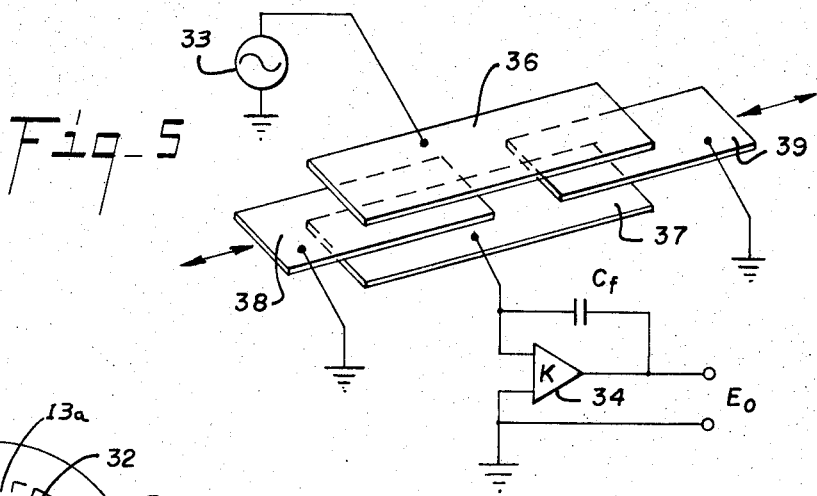
FIG. 5 is a diagramatic perspective view of another form of this invention showing a linear motion capacitive displacement transducer.

Referring to the drawings, in FIG. 1, a capacitive displacement transducer 10 of the invention is described by the preferred embodiment illustrated in the context of two stationary elements or plates 11 and 12 and two rotary movable shield elements or plates 13 and 14 therebetween, mounted in a suitable housing 15. However, the apparatus described can be easily modified in accordance with the teachings of this invention to provide for a linear motion capacitive transducer as shown in FIG. 5. Also, the capacitor elements may be flat, spaced-apart plates, or they may be cylindrical capacitive elements mounted for rotational or linear movement with respect to each other, without departing from the spirit of this invention.

Housing 15 for transducer 10 illustrated in FIGS. 1 and 2 is a box-like member having a base 16 and end walls 17 and 18. A pair of spaced-apart, vertical plates 19 and 20 made of plastic or other rigid but electrically nonconductive material, are mounted by a block 21 on base 15, and form spaced-apart partitions parallel to end walls 17 and 18. Each of plates 19 and 20 has a circular opening in its center and a rotatable shaft 22 extends from housing 11 through these openings and openings in both ends 17 and 18, and is adapted to be coupled in line between a mechanical driver element (not shown) and a mechanically driven element (not shown). Shaft 22 is mounted along its axis of rotation by suitable bearings 23 mounted in the opening in end wall 17, and bearings 24 mounted in the opening in end wall 18.

Plates 11 and 12 are circular and made of a thin-walled, conductive metal. Plate 11 is bonded to the vertical wall of plate 20 facing plate 19, and plate 12 is bonded to the vertical wall of plate 19 facing plate 20. Plates 11 and 12 are separated from each other by a small distance $d_1$ (see FIG. 3) which may be in the order of 0.05 to 0.15 inch. Plate 11 is connected to a source 33 of alternating current electrical input signals and is the driven plate, and plate 12 is connected to the input of a high gain amplifier 34 providing electrical output signals $E_o$, and is the receptor plate. Electrical connections to the plates 11 and 12 may be made by wires (as schematically shown) extending from them to the exterior of housing 15, although it is possible to mount some of the electronics in housing 15. It is preferred that housing 15 be electrically grounded, and that shaft 22 be grounded through bearings 23 and 24. In the event that bearings 23 and 24 do not provide sufficient grounding, they can be shunted by a suitable low impedance, noncontacting, capacitive shunt.

Shield plate 13 is also a circular plate (see FIG. 4) made of a thin, conductive metal and is mounted on shaft 22 at a point X along its length, by a bushing 25, for rotation with the shaft. Shield plate 13 is mounted between and parallel to plates 11 and 12, which are fixed, and includes a plurality of radially extending slots 26 symmetrically spaced about the circumference of plate 11 and having radial edges. Eight such slots are shown in the embodiment illustrated in FIG. 4, each having a circumferential width of 22.5°, leaving a 22.5° shield portion 13a between each of them.

Shield plate 14 is also a circular plate identical to shield plate 13. It is also made of a thin, conductive metal, and is mounted in between plates 13 and 11 and mechanically coupled to shaft 22 at a point Y along its length by a metal bushing 27 mounted on shaft 22 at point Y, a metal circular hub 28 connected to plate 14, and a metal cylindrical sleeve 29 which interconnects bushing 27 and hub 28, both mechanically and electrically. A plastic bearing 30 may be packed between hub 28 and shaft 22 to add rigidity to the system. Point Y is spaced from point X by the distance L. With this arrangement, plate 14 is also rotated between plates 11 and 12 with shaft 22; however, since shield plate 14 is mechanically coupled to shaft 22 at point Y and shield plate 13 is mechanically coupled to shaft 22 at point X, any twisting of shaft 22 between points X and Y during movement of shaft 22 due to transmitted torques will cause angular displacement of shield plates 13 and 14 with respect to each other, and this displacement will be proportional to the transmitted torque. It is preferred that all the components that rotate with shaft 22 be made of rigid, light material so that inertia is maintained relatively low.

Figure 4:
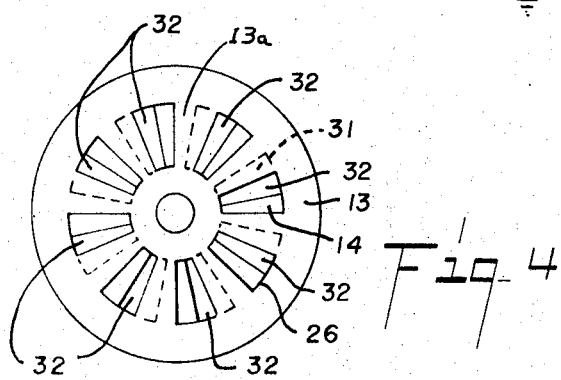
FIG. 4 is an end view in elevation showing the shield elements of the devices of both FIG. 1 and FIG. 3, aligned with respect to each other.

As shown in FIG. 4, shield plate 14 also includes a plurality of radially extending slots 31 preferably of equal size and number to slots 26 in plate 13. Slots 31 are also symmetrically arranged about the circumference of plate 14 and have radial edges. However, when shield plates 13 and 14 are mounted in housing 11 adjacent each other, and properly aligned along shaft 22 with respect to each other, with no twisting forces applied to the shaft, slots 26 and 31 are circumferentially offset from each other, as shown in FIG. 4. Looking down shaft 14 in FIG. 4, the radial edges of slots 26 preferably fall midway between the radial edges of slots 31 leaving eight equal size openings 32 through shield plates 13 and 14 and between plates 11 and 12, each opening having a circumferential width of 11.25°. The capacitive coupling between plates 11 and 12 is determined by the distance $d_1$ and the size of the openings 32 exposing plate 12 to plate 11. If shield plate 14 is rotated with respect to shield plate 13 clockwise from the position of FIG. 4, the openings 32 will decrease in size and lower this capacitive coupling. If this rotation extends 11.25°, openings 32 will become zero in size and the capacitive coupling between plates 11 and 12 will become zero. If shield plate 14 is rotated with respect to shield plate 13 counterclockwise from the position of FIG. 4, the openings 32 will increase in size and increase the capacitive coupling between plates 11 and 12. If this rotation extends 11.25°, openings 32 will be the full size of slots 26 and 31 (i.e., 22.5° width) and the maximum capacitive coupling between plates 11 and 12 will be provided. Thus, it can be seen that the capacitive coupling between plates 11 and 12, with the arrangement described, is a function of the angular relationship of plates 13 and 14 and the angle of twist between points X and Y.

Since driven plate 11 is connected to source of electrical energy 33 and receptor plate 12 is connected to amplifier 34, output signals $E_o$ from amplifier 34 will be responsive and proportional to the capacitive coupling between plates 11 and 12. The angular twist "a" in degrees between points X and Y, separated by a distance L is given by:

$$a = 584LT/D^4G \quad (1)$$

where T is the torque in in-lbs., D is the diameter of shaft 22 in inches, and G is the sheer modulus. Since "a" is proportional to the capacitance C between plates 11 and 12, the output $E_o$ is proportional to the angle "a" and thus torque. Since zero torque will be represented by an output $E_o$ corresponding to the openings 32 being half their maximum size (FIG. 4), the output $E_o$ at zero torque can be subtracted from the output $E_o$ proportional to a torque to be measured, or can be cancelled out electrically in appropriate electrical circuits connected to the output of amplifier 34.

Figure 3:
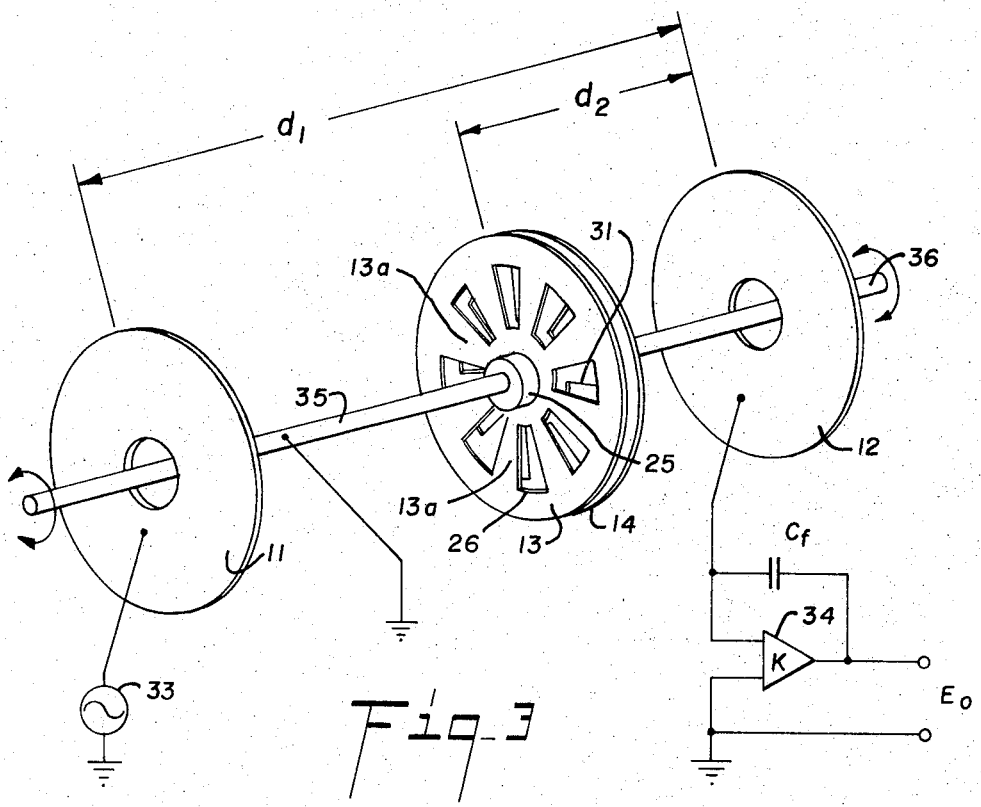
FIG. 3 is a diagramatic view of another form of the capacitive displacement transducer of this invention with the shield elements connected to two different rotatable shafts.

Referring now to FIG. 3, the same arrangement of driven, receptor, and shield plates is provided except that shield plate 13 is mounted for rotation on a shaft 35 and shield plate 14 is mounted for rotation on a separate shaft 36. Rotation of these shafts with respect to each other will cause relative angular movement between shield plates 13 and 14. Plate 11 is again connected to source 33 and plate 12 to amplifier 34, and amplifier 34 will provide electrical output signals proportional in amplitude to the angular displacement of shafts 35 and 36 with respect to each other. Of course, in both embodiments of FIGS. 2 and 3, the angular displacements being measured are generally relatively small so that angles of 11.25° are not exceeded. However, a lesser number of slots 26 and 31 of larger size can be used to increase the useful angle, or as shafts 35 and 36 rotate with respect to each other, the number of transitions through zero capacitance or maximum capacitance can be counted as markers to indicate the times that the relative rotation has exceeded 11.25°.

FIG. 5 shows an embodiment of this invention for measuring linear displacement using adjacent parallel plates. A driven plate 36 is connected to a source of alternating current input electrical signals 33 and an adjacent parallel plate 37 is connected to the input of high gain amplifier 34 having negative feedback capacitor $C_f$. Two laterally spaced-apart shield plates 38 and 39 are mounted between and parallel to plates 36 and 37, and these plates are grounded. A gap or opening is formed between adjacent ends of plates 38 and 39, and plates 36 and 37 are capacitively coupled through this gap, the size of the capacitive coupling depending on the size of the gap and the spacing between plates 36 and 37 which is fixed. Thus, as plates 38 and 39 are moved longitudinally toward or away from each other on a straight line, the capacitance formed between plates 36 and 37 varies and the output $E_o$ of amplifier 34 varies so that the output $E_o$ is proportional to the linear displacement of plates 38 and 39 with respect to each other. Plate 37 is clamped to substantially the same signal level as plates 38 and 39 (i.e., ground) by amplifier 34. This type of device has particular application in measuring very small changes in material due to stress or strain.

In each of the embodiments of FIGS. 2, 3 and 5 the shield plates together form a variable shield between the fixed driven and receptor plates. For example, in FIG. 3, as the plates 13 and 14 are placed close to plate 12, the capacitance between shield plates 13 and 14 and receptor plate 12 is quite large compared to the capacitance between the plates 11 and 12. In effect, a capacitive divider is formed as illustrated by the equivalent circuit of FIG. 6. A variable capacitor C corresponds to the capacitance between plate 11 and plate 12. Also, a capacitive $Cg$ is formed between plate 12 and shield plates 13 and 14 and other grounded surroundings, and in order to have an accurate indication of the capacitance C, the effect of the capacitance $Cg$ must be eliminated or minimized to a point where it has negligible effect on the output signal from amplifier 34.

The effect of the capacitor $Cg$ is minimized in the capacitive displacement transducer of this invention by effectively shunting capacitive $Cg$ by a substantially larger capacitance $C_{eff}$ which results in shield plates 13 and 14 and plate 12 being maintained at a very low signal level with respect to the input signals from source 33, and preferably at substantially zero signal level with respect to each other. This is accomplished in the embodiments illustrated in FIGS. 2 and 3 by connecting plate 12 to an input circuit of the high gain amplifier 34 having an open loop gain "K" preferably in the order of 50,000, and which includes a negative feedback capacitor $C_f$ connected from its output terminal to its input terminal so that the input circuit is maintained at "virtually ground" (substantially zero signal level). Since movable shield plates 13 and 14 are grounded and plate 12 is maintained at virtual ground, there is practically no signal field between plates 13, 14 and 12. Thus, stray capacity and fringing effects are minimized and the electrical fields between plates 11 and 12 through openings 32 will be substantially parallel with the axis of shaft 22.

The effective input impedance of high gain amplifier 34 connected to plate 12 looks like a capacitor $C_{eff}$ wherein:

$$C_{eff} = C_f K \quad (2)$$

and K is the open loop gain of the amplifier. By this arrangement, $C_{eff}$ can be made several orders of magnitude larger than $Cg$ at its maximum value to effectively shunt $Cg$ and render it ineffective. Accordingly with $K >> C_f/Cg$ the output of the high gain amplifier 34 can be closely approximated to be:

$$E_o = Ein \, (C/C_f) \quad (3)$$

where $E_o$ = the signal output and Ein the driving signal to plate 11.

The value of the driving electrical voltage from source 33 is not critical, but must not exceed the dielectric breakdown between the transducer elements. A voltage in the range of 10–30 volts works satisfactorily. Also, the output from the amplifier 34 is an alternating voltage of the same form as that provided by the input signal source 33. In most cases the alternating voltage will be converted to a direct current signal. For maximum accuracy and lowest ripple, the signal source should produce square wave signals. The use of this square wave signal simplifies the regulation of the amplitude of the input signal. The frequency stability of the signal source is not critical since the transfer function of the system is a ratio of capacitive reactances.

Thus, it can be seen that this invention is well adapted to provide precise measurements of small relative displacements between two objects or two points on an object. Since it may be employed with a rotating grounded shaft, with all other electrical connections made to fixed elements, it is particularly adaptable for use in measuring torques transmitted on a rotating shaft or measuring displacement between two already moving objects. The capacitive displacement transducer of the invention is a noncontacting transducer of infinite resolution, excellent linearity, repeatability and stability. Furthermore, since the transducer does not have any critical sliding contacts, there is virtually no wear problem. In addition, since the capacitance between plates 11 and 12 depends on the fixed distance $d_1$, and the axial position of the movable elements 13 and 14 does not have to be critically maintained, the transducer 10 can be relatively inexpensively built and still provide the high degree of linearity, stability, and repeatability required.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrated and not in a limiting sense.

The invention having been described, what is claimed is:

1. Apparatus for converting relative displacement into electrical signals comprising: a conductive driven element adapted to be connected to a source of input electrical signals; a conductive receptor element positioned adjacent said driven element; a first conductive shield element positioned between said driven and receptor elements; a second conductive shield element positioned between said driven and receptor elements and adjacent said first shield element, said first and second shield elements providing a variable shield between said driven and receptor elements in response to relative movement with respect to each other and aligned with respect to each other to vary the capacitance between said driven and receptor elements in response to such relative movement; means for maintaining said first and second shield elements at a substantially lower signal level than the level of said input electrical signals; and means for causing movement of one of said shield elements with respect to the other in response to a relative displacement to be measured, whereby measurable variations in said capacitance responsive to such displacement are provided, and circuit means coupled to said receptor element for developing electrical output signals responsive to said variations in said capacitance, and including means for maintaining said receptor element at a substantially lower signal level than the level of said input electrical signals.

2. The apparatus of claim 1 wherein each of said first and second shielded elements are connected to separate movable objects.

3. The apparatus of claim 2 wherein each of said driven, receptor and shield elements are circular disks and said first and second shield elements are each connected for rotation with a separate rotatable shaft.

4. The apparatus of claim 3 wherein said variable shield is formed by a plurality of radial slots in each of said first and second shield elements, the slots of one shield element being adjacent the slots of the other shield element and circumferentially offset from said other slots, to form a plurality of openings between the driven and receptor elements which vary in size in response to angular displacement of one shield element with respect to the other.

5. The apparatus of claim 1 wherein each of said driven, receptor and shield elements are flat, parallel plates and said shield elements are arranged for linear motion with respect to each other.

6. The apparatus of claim 1 further including means for mechanically coupling said first shield element to an object at a first point along the object, and means for mechanically coupling said second shield element to the same object at a second point along the object and spaced from the first point, whereby relative movement of said first and second points with respect to each other will cause displacement of said first and second shield elements with respect to each other.

7. The apparatus of claim 6 wherein said means for causing said relative movement is a rotatable shaft and said first and second shield elements are circular disks and each are mechanically coupled to different points on said shaft.

8. The apparatus of claim 1 wherein said last mentioned means comprises means for providing an effective capacitance in shunt with the capacitance between said receptor element and said first and second shield elements, said effective capacitance being sufficiently larger than said capacitance between said receptor element and said first and second shield elements so that said receptor element is maintained at a substantially zero signal level with respect to said first and second shield elements.

9. The apparatus of claim 1 wherein said circuit means includes an amplifier circuit having a negative feedback circuit, said receptor element being coupled to the input circuit of said amplifier circuit so that said receptor is maintained at a substantially zero signal level with respect to the first and second shield elements.

10. The apparatus of claim 9 wherein said negative feedback circuit includes capacitive means coupled between said input circuit and the output circuit of said amplifier.

11. Apparatus for sensing torque transmitted between two objects, comprising, a housing; a rotatable shaft passing through said housing and supported for rotation with respect to said housing; a conductive driven element mounted in said housing and adapted to be connected to a source of input electrical signals; a conductive receptor element mounted in said housing adjacent said driven element; a first conductive shield element positioned between said driven and receptor elements; means for mechanically coupling said first shield element to said shaft at a first point along its length; a second conductive shield element positioned between said driven and receptor elements, said first and second shield elements providing a variable shield between said driven and receptor elements in response to relative movement with respect to each other, and aligned with respect to each other to vary the capacitance between said driven and receptor elements in response to said relative movement; means for mechanically coupling said second shield element to said shaft at a second point along its length whereby angular displacement of one of said points with respect to the other in response to a torque to be sensed causes relative movement between said first and second shield elements; and means for maintaining said first and second shield elements and said shaft at substantially zero signal level with respect to said input signals.

12. The apparatus of claim 11 wherein said variable shield is formed by a plurality of radial slots in each of said first and second shield elements, the slots of one shield element being adjacent the slots of the other shield element and circumferentially offset from said other slots, to form a plurality of openings between the driven and receptor elements which vary in size in response to angular displacement of one shield element with respect to the other.

13. The apparatus of claim 11 further including circuit means coupled to said receptor element for developing electrical output signals responsive to variations in said capacitance, and including means for maintaining said receptor element at substantially zero signal level with respect to said first and second shield elements.

14. The apparatus of claim 13 wherein said variable shield is formed by a plurality of radial slots in each of said first and second shield elements, the slots of one shield element being adjacent the slots of the other shield element and circumferentially offset from said other slots, to form a plurality of openings between the driven and receptor elements which vary in size in response to angular displacement of one shield element with respect to the other.

15. The apparatus of claim 13 wherein said last mentioned means comprises means for providing an effective capacitance in shunt with the capacitance between said receptor element and said first and second shield elements, said effective capacitance being sufficiently larger than said capacitance between said receptor element and said first and second shield elements so that said receptor element is maintained at a substantially zero signal level with respect to said first and second shield elements.

16. The apparatus of claim 13 wherein said circuit means includes an amplifier circuit having a negative feedback circuit, said receptor element being coupled to the input circuit of said amplifier circuit so that said receptor element is maintained at a substantially zero signal level with respect to the first and second shield elements.

17. The apparatus of claim 16 wherein said negative feedback circuit includes capacitive means coupled between said input circuit and the output circuit of said amplifier.

* * * * *